UNITED STATES PATENT OFFICE.

CHARLES E. WICKLIFFE, OF NEW YORK, N. Y., ASSIGNOR OF ONE-FOURTH TO JOHN JENNERICH AND ONE-FOURTH TO THOMAS McMURRAY, BOTH OF NEW YORK, N. Y.

ANTIFOULING PAINT.

1,358,269.  Specification of Letters Patent.  Patented Nov. 9, 1920.

No Drawing.  Application filed March 24, 1920. Serial No. 368,213.

*To all whom it may concern:*

Be it known that I, CHARLES E. WICKLIFFE, a citizen of the United States, and resident of the borough of Manhattan, city, county, and State of New York, have invented certain new and useful Improvements in Antifouling Paint, of which the following is a specification.

This invention relates to improvements in paints, and has for its object to provide a paint which, when applied to the exterior of the hull of a ship, will prevent barnacles and sea-grass from adhering to the ship's hull.

The paint compound consists of a mixture of cyanid of mercury, a suitable pigment or pigments, and a suitable vehicle and drier. The pigment or pigments will of course vary according to the color of paint desired. For the vehicle and drier I employ a mixture of turpentine, linseed oil and japan. In preparing the paint I prefer to use the ingredients in about the following proportions—viz., one pound of cyanid of mercury, fifteen pounds of pigment, and approximately one gallon of the liquid vehicle and drier. The ingredients may be mixed in a paint mill or in any other suitable manner. It will be obvious that the proportions may be varied to increase or diminish the amount of coloring matter or the amount of poisonous matter, and to vary the consistency of the paint. It will also be obvious that the paint may be thinned in any known manner, as by the addition of turpentine, or thickened by adding white lead.

Paints made in accordance with the following formulæ will give good results:

*Green paint.*

| | |
|---|---|
| Cyanid of mercury | 1 lb. |
| Verdigris | 5 lbs. |
| Paris green | 5 lbs. |
| Chrome green | 5 lbs. |
| Linseed oil | 5 pts. |
| Turpentine | 3 pts |
| Japan | 1 pt. |

*Red paint.*

| | |
|---|---|
| Cyanid of mercury | 1 lb. |
| Red pigment (such as red mineral oxid) | 15 lbs. |
| Linseed oil | 5 pts. |
| Turpentine | 3 pts. |
| Japan | 1 pt. |

It will be noted that in the formula for green paint I employ three different kinds of green pigments, namely verdigris, chrome green, and Paris green, the latter being a poison as well as a pigment.

What I claim is:

1. An antifouling paint comprising cyanid of mercury, coloring material, linseed oil, turpentine and japan in approximately the following proportions, viz. cyanid of mercury, 1 lb.; coloring material, 15 lbs.; linseed oil, 5 pts.; turpentine, 3 pts.; japan, 1 pt.

2. An antifouling paint comprising cyanid of mercury, Paris green, linseed oil, turpentine and japan.

In testimony whereof I hereunto affix my signature.

CHARLES E. WICKLIFFE.